(12) United States Patent
Schaefer et al.

(10) Patent No.: US 7,576,229 B2
(45) Date of Patent: Aug. 18, 2009

(54) HYDROXYALKYL-FUNCTIONALIZED FILLERS

(75) Inventors: Oliver Schaefer, Burghausen (DE); Christopher Briehn, Munich (DE); Torsten Gottschalk-Gaudig, Mehring (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 11/815,354

(22) PCT Filed: Jan. 26, 2006

(86) PCT No.: PCT/EP2006/000691

§ 371 (c)(1),
(2), (4) Date: Aug. 2, 2007

(87) PCT Pub. No.: WO2006/081979

PCT Pub. Date: Aug. 10, 2006

(65) Prior Publication Data

US 2008/0139833 A1    Jun. 12, 2008

(30) Foreign Application Priority Data

Feb. 3, 2005    (DE) .................. 10 2005 005 046

(51) Int. Cl.
*C07F 7/04* (2006.01)

(52) U.S. Cl. .................. 556/444; 106/499; 106/506

(58) Field of Classification Search .................. 556/444
See application file for complete search history.

(56) References Cited

U.S. PATENT DOCUMENTS 3,778,289 A * 12/1973 Bockmann et al. .......... 106/445
5,595,593 A * 1/1997 Burns et al. .................. 106/499

FOREIGN PATENT DOCUMENTS

| DE | 1593867 | 10/1970 |
| DE | 2113297 | 9/1972 |
| EP | 0768347 A2 | 4/1997 |

OTHER PUBLICATIONS

Derwent Abstract corresponds to DE 1 593 867, Date: Oct. 1969.
Particle size distribution measurement from millimeters to nanometers and from rods to platelets; J. Disp. Sci & Tech., vol. 23(5), 631-662, 2002.

* cited by examiner

*Primary Examiner*—Sikarl A. Witherspoon
*Assistant Examiner*—Chukwuma O Nwaonicha
(74) *Attorney, Agent, or Firm*—Brooks Kushman P.C.

(57) ABSTRACT

Hydroxyalkyl-functionalized particles are prepared by reacting a cyclic siloxy compound containing a glycol residue, an oxygen of the glycol residue bonded to silicon of a siloxy group through an intermediary methylene or substituted methylene linking group.

19 Claims, No Drawings

HYDROXYALKYL-FUNCTIONALIZED FILLERS

CROSS-REFERENCE TO RELATED APPLICATION

This application is the U.S. national phase of PCT Appln. No. PCT/EP2006/000691 filed Jan. 26, 2006 which claims priority to German application DE 10 2005 005 046.8 filed Feb. 3, 2005.

BACKGROUND OF THE INVENTION

1. Field of the Invention

The invention relates to hydroxyalkyl-functionalized fillers, to a process for preparing them, and to their use.

2. Description of the Related Art

A filler is a finely divided solid which alters the properties of a matrix to which it is added. Fillers are presently in use in the chemical industry for numerous purposes. They may alter the mechanical properties of plastics, such as hardness, tensile strength, chemical resistance, electrical or thermal conductivities, adhesion or else the contraction experienced in the event of temperature changes. Further factors they influence include the rheological behavior of polymeric melts. Functionalizing fillers with chemically reactive groups can improve their compatibility with the matrix and hence also optimize the profile of properties of the formulated compound. Preferred groups in this context are those able to react with the matrix itself, such as carbinol groups, which are able to react with polyesters, polyurethanes or polyacrylates, for example. In formulations, appropriate modification of the fillers and/or particle surface ensures compatibility of the particle with the surrounding polymer matrix. Moreover, where the particle surface possesses appropriate reactivity toward the matrix, such that under the particular curing conditions of the formulation it is able to react with the binder system, the particles can be incorporated chemically into the matrix in the course of curing, such incorporation frequently having a positive effect on the profile of properties of the formulated compound.

EP 768347 describes a method of treating fillers that starts from specific cyclic silanes of the general formula I which can be consumed by reaction with metal hydroxide functions to form carbinol groups.

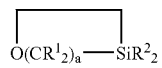

(I)

In this formula $R^1$ is a carbon radical having up to 20 carbon atoms, $R^2$ is hydrogen or a hydrocarbon radical having up to 20 carbon atoms, and a commonly has a value of 3 or 4. Particular attention is drawn to the fact that the reaction is performed without the use of catalysts at temperatures between 25° C. and 150° C. In practice, however, a number of problems arise during the implementation of the method: although it is possible to obtain a stable six-membered ring with a=4, doing so nevertheless requires an elevated reaction temperature and significantly prolonged reaction times in the reaction with metal hydroxide functions or silanol end groups. The synthesis of this stable 6-membered ring, moreover, requires a very complicated process, in which an organometallic silicon compound is inserted into a tetrahydrofuran ring. The 5-membered rings that are reactive in the sense of EP 768347 are unstable substances which tend toward decomposition or autopolymerization. Consequently the method described in EP 768347 is poorly suited to industrial use, since the silane compounds used either cannot be stably obtained or are accessible only by way of technically complex synthesis techniques.

SUMMARY OF THE INVENTION

It was an object of the present invention to provide a hydroxyalkyl-functional filler which is preparable by means of a simple process. This and other objects are achieved by reaction of a reactive filler with a siloxy-group-containing cyclic compound containing a glycol residue, one oxygen of the glycol residue linked to a siloxy group through the intermediary of a methylene or substituted methylene linking group.

DETAILED DESCRIPTION OF THE PREFERRED EMBODIMENTS

The invention provides particles P1 which on their surface possess radicals of the general formula (II)

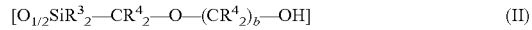

(II)

where $R^3$ and $R^4$ are identical or different and are hydrogen radical or monovalent, unsubstituted or —CN—, —NCO—, —NR$^x_2$—, —COOH—, —COOR$^x$—, —PO(OR$^x$)$_2$—, -halogen-, -acryloyl-, -epoxy-, —SH—, —OH— or —CONR$^x_2$-substituted $C_1$-$C_{20}$ hydrocarbon radical or $C_1$-$C_{15}$ hydrocarbonoxy radical in each of which one or more nonadjacent methylene units may have been replaced by groups —O—, —CO—, —COO—, —OCO—, or —OCOO—, —S—, or —NR$^x$—, and in which one or more nonadjacent methine units may have been replaced by groups —N=, —N=N—, or —P=, $R^x$ is hydrogen radical or an unsubstituted or —CN— or halogen-substituted $C_1$-$C_{10}$ hydrocarbon radical, b is an integral value of at least 1.

The particles P1 are preferably surface-modified particles comprising a metal oxide, more preferably a silica, with particular preference a fumed silica, the surface being modified with groups of the general formula II.

The particles P1 of the invention preferably possess an average primary-particle size, i.e., an average particle diameter, of less than 100 nm, more preferably having an average primary-particle size of 5 to 50 nm, these primary particles often not existing in isolation within the silica but instead being constituents of larger aggregates (as defined in DIN 53206), which have a diameter of 100 to 1000 nm and form agglomerates (as defined in DIN 53206) which, depending on the external shearing load, have sizes of 1 to 500 μm; the silica has a specific surface area of 10 to 400 m$^2$/g (measured by the BET method in accordance with DIN 66131 and 66132), a fractal mass dimension $D_m$ of less than or equal to 2.8, preferably less than or equal to 2.7, more preferably of 2.4 to 2.6, and a surface silanol group SiOH density of less than 1.5 SiOH/nm$^2$, preferably of less than 0.5 SiOH/nm$^2$, more preferably of less than 0.25 SiOH/nm$^2$.

The particles P1 are preparable by reacting (a) particles P of a material which possesses a surface having a radical selected from the group consisting of M-OH, Si—OH, M-O-M-, M-O—Si, Si—O—Si, M-OR$^1$, and Si—OR$^1$, (b) with compounds of the general formula III

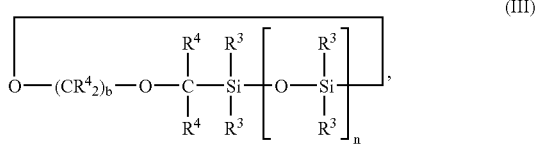

and/or their hydrolysis, alcoholysis or polymerization products, where $R^3$ and $R^4$ are identical or different and are a hydrogen radical or monovalent, unsubstituted or —CN—, —NCO—, —NR$^x_2$—, —COOH—, —COOR$^x$—, —PO(OR$^x$)$_2$—, -halogen-, -acryloyl-, -epoxy-, —SH—, —OH— or —CONR$^x_2$— substituted $C_1$-$C_{20}$ hydrocarbon radical or $C_1$-$C_{15}$ hydrocarbonoxy radical in each of which one or more nonadjacent methylene units may have been replaced by groups —O—, —CO—, —COO—, —OCO—, or —OCOO—, —S—, or —NR$^x$—, and in which one or more nonadjacent methine units may have been replaced by groups —N=, —N=N—, or —P=, $R^x$ is hydrogen radical or an unsubstituted or —CN— or halogen-substituted $C_1$-$C_{10}$ hydrocarbon radical, b is integral value $\geq 1$, n is 0 or an integral value.

$R^3$ is preferably hydrogen, an alkyl, cycloalkyl or aryl radical, more preferably a hydrogen, methyl, ethyl or phenyl radical, with particular preference hydrogen or a methyl or ethyl radical.

$R^4$ is preferably hydrogen, an alkyl, cycloalkyl, aryl or arylalkyl radical, more preferably a hydrogen, methyl, ethyl or phenyl radical, with particular preference given to hydrogen.

The value n preferably adopts the values 0 or 1. With particular preference n is =0.

The value b preferably adopts the values 1, 2 or 3. With particular preference b is =2.

If desired the reaction mixture further comprises a protic solvent, preferably water or an alcohol.

The use of compounds of the general formula III allows particle functionalization even in the absence of water. In the course of this functionalization it is possible, in a stoichiometric reaction, for virtually all of the metal OH (M-OH) and/or SiOH groups on the surface of the particle to be saturated with radicals of the general formula II. Remnant metal OH and/or SiOH groups, which can limit the stability of the particles, are therefore largely avoidable.

The high reactivity of the compounds of the general formula III with a methylene spacer between alkoxysilyl group and a heteroatom makes them especially suitable for functionalizing SiOH— and/or M-OH-carrying particles P.

A feature of the particles P is that on their surface they possess metal (M-OH), silicon hydroxide (SiOH), M-O-M, M-O—Si and/or Si—O—Si functions, via which reaction can take place with the compound of the general formula III.

As particles P it is possible in principle to use all metal oxide and mixed metal oxide particles (e.g., aluminum oxides such as corundum, mixed aluminum oxides with other metals and/or silicon, titanium oxides, zirconium oxides, iron oxides, zinc oxides, etc.), silicon oxide particles (e.g., colloidal silica, fumed silica, precipitated silica, silica sols, mineral glasses, quartz glasses or window glass) or silicon oxide compounds in which certain valences of the silicon have been provided with organic radicals (e.g., silicone resins). A further possibility is to use metals with an oxidized surface, such as silicon, aluminum, and iron.

The particles P preferably possess an average particle size of less than 1 mm, the average size of the particles having been determined by means of transmission electron microscopy.

With particular preference they possess an average particle size of 5 to 100 nm. These primary particles may be present in isolation, but may also be constituents of larger aggregates and agglomerates.

Preferred particles P are metal oxides. The metal oxide preferably has a specific surface area of preferably 0.1 to 1000 m$^2$/g (measured by the BET method in accordance with DIN 66131 and 66132), more preferably of 10 to 500 nm$^2$/g.

The particles P may be in the form of aggregates (as defined in DIN 53206), preferably in the range of diameters of 100 to 1000 nm, the metal oxide having agglomerates (as defined in DIN 53206) which are composed of aggregates and which, depending on the external shearing load (caused by the measuring conditions, for example), may have sizes of 1 to 1000 µm.

For reasons of technical manageability the particle P is preferably an oxide having a covalent bonding fraction in the metal-oxygen bond, preferably an oxide, in the solid aggregate state, of the main-group and transition-group elements, for example an oxide of main group 3 such as boron, aluminum, gallium or indium oxide, or of main group 4 such as silicon dioxide, germanium dioxide, or tin oxide or dioxide, lead oxide or dioxide, or an oxide of transition group 4, such as titanium dioxide, zirconium oxide, or hafnium oxide. Other examples are stable oxides of nickel, cobalt, iron, manganese, chromium, or vanadium.

Particular preference is given to aluminum(III), titanium (IV), and silicon(IV) oxides, such as silica gels or silicas prepared by a wet-chemical method, precipitation for example, or aluminum oxides, titanium dioxides or silicon dioxides prepared in operations at elevated temperature, such as, for example, pyrogenically prepared aluminum oxides, titanium dioxides or silicon dioxides. Other solids which can be employed as particles P are silicates, aluminates or titanates, or aluminum phyllosilicates, for example bentonites, montmorillonites, smectites or hectorites. Further solids which can be employed as particles P are soot blacks, such as lamp blacks and furnace blacks, or blacks which can be used as a colorant or as a reinforcing filler or as a rheological additive, which are known as carbon blacks.

Particular preference is given to fumed silica, which is prepared pyrogenically in a flame reaction from organosilicon compounds. It is prepared, for example, from silicon tetrachloride, methyldichlorosilane, hydrotrichlorosilane, hydromethyldichlorosilane, other methylchlorosilanes or alkylchlorosilanes, as they are or in a mixture with hydrocarbons, in an oxygen-hydrogen flame for example, or else in a carbon monoxide-oxygen flame. The silica can be prepared optionally with or without the addition of water, in the purification step, for example; it is preferred not to add water.

The fumed silica preferably has a fractal surface dimension of less than or equal to 2.3, more preferably of less than or equal to 2.1, with particular preference of 1.95 to 2.05. The fractal surface dimension, $D_s$, is defined as follows:

particle surface area A is proportional to particle radius R to the power of $D_s$.

The precipitated silica preferably has a fractal mass dimension, Dm, of less than or equal to 2.8, more preferably less than or equal to 2.7, and most preferably of 2.4 to 2.6. The fractal mass dimension $D_m$, is defined as follows: particle mass M is proportional to particle radius R to the power of $D_m$.

The silica preferably has a density of surface silanol groups, SiOH, that are amenable to a chemical reaction of less than 2.5 $SiOH/nm^2$, more preferably less than 2.1 $SiOH/nm^2$, most preferably less than 2 $SiOH/nm^2$, and with particular preference, 1.7 to 1.9 $SiOH/nm^2$.

It is possible to use silicas prepared by a wet-chemical route or prepared at a high temperature (greater than 1000° C.). Particular preference is given to silicas prepared pyrogenically. It is also possible to employ hydrophilic metal oxides which come freshly prepared directly from the burner, have been stored, or have already been packaged in a commercially customary fashion. Additionally it is possible to use hydro phobicized metal oxides or silicas, examples being commercially customary silicas.

Use may be made of uncompacted silicas, with bulk densities of preferably less than 60 g/l, and of compacted silicas, having bulk densities preferably of greater than 60 g/l.

Any desired mixtures of the stated solids may be used for surface modification: for example, mixtures of metal oxides or silicas having different BET surface areas, or mixtures of metal oxides having different degrees of hydrophobicization or silylation.

For surface modification the compounds of the general formula III can be used alone or in any desired mixtures with organosiloxanes composed of units of the formulae $(R^5{}_3SiO_{1/2})$, and/or $(R^5{}_2SiO_{2/2})$, and/or $(R^5SiO_{3/2})$, the number of these units in an organosiloxane being at least 2, where $R^5$ can be a monovalent saturated, monounsaturated or polyunsaturated, unhalogenated or halogenated hydrocarbon radical perferably having 1 to 18 C atoms, or a halogen, nitrogen, $OR^6$, $OCOR^6$ or $O(CH_2)_xOR^6$ radical, $R^6$ being hydrogen or a monovalent hydrocarbon radical having 1 to 18 C atoms, wherein the radicals $R^5$ may be identical or different. At the temperature of covering, the organosiloxanes are preferably liquid.

Examples of $R^5$ are alkyl radicals such as the methyl radical, the ethyl radical, propyl radicals such as the isopropyl or the n-propyl radical, butyl radicals such as the tert-butyl or n-butyl radical, pentyl radicals such as the neopentyl, the isopentyl or the n-pentyl radical, hexyl radicals such as the n-hexyl radical, heptyl radicals such as the n-heptyl radical, octyl radicals such as the 2-ethylhexyl or the n-octyl radical, decyl radicals such as the n-decyl radical, dodecyl radicals such as the n-dodecyl radical, hexadecyl radicals such as the n-hexadecyl radical, octadecyl radicals such as the n-octadecyl radical, alkenyl radicals such as the vinyl, the 2-allyl or the 5-hexenyl radical, aryl radicals such as the phenyl, the biphenyl or naphthenyl radical, alkylaryl radicals such as the benzyl, ethylphenyl, tolyl or xylyl radical, halogenated alkyl radicals such as the 3-chloropropyl, the 3,3,3-trifluoropropyl or the perfluorohexylethyl radical, and halogenated aryl radicals such as the chlorophenyl or chlorobenzyl radical.

Preferred examples of $R^5$ are the methyl radical, the octyl radical and the vinyl radical, the methyl radical being particularly preferred.

Examples of organosiloxanes are linear or cyclic dialkylsiloxanes having an average number of dialkylsiloxy units of greater than 2, preferably greater than 10. The dialkylsiloxanes are preferably dimethylsiloxanes. Examples of linear polydimethylsiloxanes are those having the following end goups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacetoxysiloxy, methyldiacetoxysiloxy; particularly preferred are trimethylsiloxy and dimethylhydroxysiloxy. The end groups may be identical or different.

The particles of the invention can be prepared in continuous or batchwise processes. The process for silylation may be composed of one or more steps.

The silylated particles are preferably prepared by means of a process which comprises the following steps:
  (A) supplying a particle,
  (B) silylating the particle, comprising the steps of
    (1) covering the particle of a compound of the general formula III,
    (2) reacting the particle with the compound of the general formula III,
    (3) purifying the particle to remove excess compound of the general formula III.

The silylation is preferably conducted in an atmosphere which does not lead to the oxidation of the silylated metal oxide, i.e., preferably less than 10% by volume oxygen, more preferably less than 2.5% by volume, the best results being achieved with less than 1% by volume oxygen, i.e., the reaction being carried out in a predominantly inert carrier gas.

Covering, reaction, and purification can be carried out as a batchwise or continuous operation, a continuous reaction regime being preferred on technical grounds.

Covering takes place preferably at temperatures of −30-250° C., preferably 20-150° C., with particular preference 20-120° C.; the covering step is preferably cooled to 30-50° C.

The residence time is 1 min-48 h, preferably 15 min to 360 min, with particular preference—for reasons of the space/time yield—15 min to 90 min.

The pressure in the covering stage ranges from a slight underpressure of down to 0.2 bar up to an overpressure of 100 bar, preference being given on technical grounds to normal pressure—that is, unpressurized operation with respect to external/atmospheric pressure.

The compound of the general formula III is added to the particles preferably in liquid form and in particular is mixed into the pulverulent metal oxide. This admixing is preferably done by means of nozzle techniques or comparable techniques, examples being effective spraying techniques, such as spraying in 1-fluid nozzles under pressure (preferably 5 to 20 bar), spraying in 2-fluid nozzles under pressure (preferably gas and liquid 2-20 bar), ultrafine division with atomizers or gas/solid exchange assemblies with movable, rotating or static internals which permit homogeneous mixing of the silane with the pulverulent metal oxide.

The silane of the general formula III is preferably added as an ultrafinely divided aerosol to the metal oxide, the aerosol having a settling velocity of 0.1-20 cm/s and a droplet size with an aerodynamic particle radius of 5-25 μm.

The loading of the metal oxide and the reaction with the compound of the general formula III take place preferably under mechanical or gas-supported fluidization. Mechanical fluidization is particularly preferred.

Gas-supported fluidization may take place by means of all inert gases which do not react with the compound of the general formula III, the metal oxide, or the silylated metal oxide; that is, do not lead to secondary reactions, degradation reactions, oxidation events or flame or explosion phenomena. The inert gas in question is preferably $N_2$, Ar, other noble gases or $CO_2$. The fluidizing gases are supplied preferably in the range of superficial gas velocities of 0.05 to 5 cm/s, with particular preference of 0.5-2.5 cm/s.

Particular preference is given to mechanical fluidization, which takes place, without additional employment of gas beyond that used for inertization, by means of paddle stirrers, anchor stirrers, and other suitable stirring elements.

In one particularly preferred version, unreacted compound of the general formula III and exhaust gases from the purification step are recycled to the step of the covering of the metal oxide; this recycling may be partial or complete, accounting preferably for 10%-90% of the overall volume flow of the gases emerging from the purification step.

This is done in suitably thermostated apparatus.

This recycling takes place preferably in non-condensed phase, i.e., in the form of gas or in the form of vapor. This recycling may take place as mass transport along a pressure equalization, or as controlled mass transport with the standard industry gas transport systems, such as fans, pumps, and compressed-air membrane pumps. Since it is preferred to recycle the noncondensed phase, it may be advisable to heat the recycle lines.

The recycling of the unreacted silane of the general formula III and the exhaust gases may be situated in this case at between 5% and 100% by weight, based on their total mass, preferably between 30% and 80% by weight. Recycling, based on 100 parts of freshly employed silane, may be between 1 and 200 parts, and may preferably be 10 to 30 parts.

The recycling of the purification products from the silylating reaction to the covering stage is preferably continuous.

The reaction takes place preferably at temperatures of −30-250° C., preferably 20-150° C., and more preferably at 20-120° C.

The reaction time is 1 min to 48 h, preferably 15 min to 6 h.

It is possible, optionally, to add protic solvents, such as liquid or vaporizable alcohols or water; typical alcohols are isopropanol, ethanol, and methanol. It is also possible to add mixtures of the abovementioned protic solvents. Preference is given to adding 1% to 50% by weight of protic solvent, based on the metal oxide, more preferably 5% to 25% by weight. Water is particularly preferred. Optionally it is possible to add acidic catalysts of acidic character, in the sense of a Lewis acid or of a Brönsted acid, such as hydrogen chloride, or basic catalysts of basic character, in the sense of a Lewis base or a Brönsted base, such as ammonia. If catalysts are added they are preferably added in trace amounts, i.e., in amounts less than 1000 ppm. With particular preference no catalysts are added.

Purification takes place preferably at a temperature of 20 to 200° C., more preferably 50° C. to 150° C., with particular preference of 50 to 100° C.

The purification step is preferably characterized by agitation, with preference being given to slow agitation and slight commixing in particular. The stirring elements are set and agitated advantageously in such a way that, preferably, mixing and fluidization occur.

The purification step may additionally be characterized by an increased gas input, corresponding to a superficial gas velocity of preferably 0.001 to 10 cm/s, more preferably 0.01 to 1 cm/s. This can be done by means of all inert gases which do not react with the silane of the general formula III, the metal oxide or particle, and with the silylated metal oxide or the silylated particle; that is, which do not lead to secondary reactions, degradation reactions, oxidation events or flame or explosion phenomena, such as, preferably, $N_2$, Ar, other noble gases or else $CO_2$.

In another preferred version of the invention the particles P used are colloidal silicon oxides or metal oxides present preferably in the form of a dispersion of the corresponding oxide particles, of micron or submicron size, in an aqueous or organic solvent. In this case it is possible with preference to use the oxides of the metals aluminum, titanium, zirconium, tantalum, tungsten, hafnium, tin or zinc. Preference is given to using organic particle solutions or suspensions, which are reacted preferably with compounds of the general formula III.

One or more different particle types P may be used. Thus, for example, filler systems can be prepared which as well as $SiO_2$ also comprise corundum.

Examples of compounds of the general formula III that are employed with preference are 2,2-dimethyl-1,4-dioxa-2-silacyclohexane; 2,2,5-trimethyl-1,4-dioxa-2-silacyclohexane, 2,2,6-trimethyl-1,4-dioxa-2-silacyclohexane; 2,2,5,6-tetramethyl-1,4-dioxa-2-silacyclohexane; 2,2-dimethyl-1,4-dioxa-2-silacycloheptane; 2,2,5-trimethyl-1,4-dioxa-2-silacycloheptane; 2,2,6-trimethyl-1,4-dioxa-2-silacycloheptane; 2,2,7-trimethyl-1,4-dioxa-2-silacycloheptane; and 2,2,5,7-tetramethyl-1,4-dioxa-2-silacycloheptane.

For the functionalization of the particles it is possible to use one compound of the general formula III, individually, or a mixture of different compounds of the general formula III, or else a mixture of compounds of the general formula III with other silanes.

Where compounds of the general formula III are used, they react readily and in a targeted way, with good yields, to give carbinols. Compounds of the general formula III are stable, storable, can be synthesized very easily from simple precursors, as for example in accordance with DE 1593867 A, and are therefore especially suitable for use on the industrial scale.

As compounds of the general formula III it is preferred to use compounds of the general formula IV

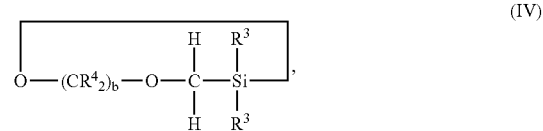

(IV)

wherein $R^3$, $R^4$, and b are as already defined.

With particular preference b is a 2, $R^4$ is a hydrogen radical, and $R^3$ is a methyl or ethyl radical.

A process of this kind can be carried out uncatalyzed, preferably at temperatures from 0° C. to 200° C. Preferably, though, reaction temperatures of at least 40° C. are used. The process, however, can be improved further by adding certain catalysts. These catalysts are acidic or basic compounds, and mean that both reaction times and reaction temperatures can be reduced.

The catalyst used is an organic or inorganic Lewis acid or Lewis base, such as organic Brönsted acid or base, an organometallic compound or a halide salt.

Preferred acids used are carboxylic acids, partially esterified carboxylic acids, particularly mono-carboxylic acids, preferably formic acid or acetic acid, or unesterified or partially esterified mono-phosphoric, oligophosphoric or polyphosphoric acids. Preferred bases employed are preferably alkylammonium hydroxides, alkylammonium silanolates, ammonium alkoxides, alkylammonium fluorides, amine bases or metal alcoholates or metal alkyls. Preferred metal alcoholates are lithium or sodium alcoholates. Preferred organometallic reagents are organotin compounds, organozinc compounds or organotitanium compounds or organolithium compounds or Grignard reagents. Preferred salts are tetraalkylammonium fluorides.

Preference is given among others to phosphoric acids of the general formula V

$$O=P(OR^5)_{3-v}(OH)_v, \quad (V),$$

in which
$R^5$ is an unsubstituted or substituted linear or branched $C_1$-$C_{30}$ alkyl, $C_2$-$C_{40}$ alkenyl or alkoxyalkyl, $C_2$-$C_{40}$ polyether or $C_5$-$C_{14}$ cycloalkyl or aryl radical and
v denotes the values 0, 1 or 2.

The catalysts, after the functionalization of the silanol groups are deactivated, preferably by addition of what are called anticatalysts or catalyst poisons, before they can lead to cleavage of the Si—O—Si groups. This secondary reaction is dependent on the catalyst used and need not necessarily occur, so that if appropriate it is also possible to forego deactivation. Examples of catalyst poisons are acids, for example, when bases are used and bases, for example, when acid are used, leading in terms of ultimate effect to a simple neutralization reaction with corresponding neutralization products, which when appropriate can be removed by filtration or extracted. The corresponding product of reaction between catalyst and catalyst poison may, depending on the use of the product, either be removed from the product or remain in the product.

After the neutralization the reaction product preferably has a slightly acidic pH of 3 to 7.

In the process for preparing carbinol-modified fillers the amount of the compound of the general formula III that is employed is dependent upon the amount of M-OH groups in the filler that are to be functionalized. If, however, complete functionalization of the OH groups is the aim, then the compound containing units of the general formula III must be added in at least equimolar amounts, relative to n. If compound containing units of the general formula III is used in excess, then unreacted compound subsequently can either be distilled off or hydrolyzed and then removed, where appropriate, likewise, by distillation.

The process is carried out preferably at 0° C. to 200° C., more preferably at 40° C. to 150° C. The process can be carried out either with the inclusion of solvents, or else without the use of solvents, in suitable reactors. It is operated where appropriate under vacuum or under overpressure or at normal pressure (0.1 MPa).

When solvents are used, preference is given to inert solvents, especially aprotic solvents such as aliphatic hydrocarbons, for example heptane or decane, and aromatic hydrocarbons such as toluene or xylene. Likewise possible for use are ethers such as THF, diethyl ether or MTBE. The amount of solvent should be sufficient to ensure adequate homogenization of the reaction mixture. Solvents or solvent mixtures having a boiling point or boiling range of up to 120° C. at 0.1 MPa are preferred.

Additionally, during the silylation or following the purification, it is preferred to use methods for the mechanical compaction of the metal oxide, such as, for example, press rollers, milling assemblies, such as edge runner mills and ball mills, continuously or batchwise, compaction by screws or worm mixers, worm compactors, briquetting machines, or compaction by suction withdrawal of the air or gas present, by means of suitable vacuum methods.

Particular preference is given to mechanical compaction during the silylation, in step (B) 2) of the reaction, by means of press rollers, abovementioned milling assemblies such as ball mills, or compaction by means of screws, worm mixers, worm compactors and/or briquetting machines.

In a further particularly preferred procedure purification is followed by deployment of methods for the mechanical compaction of the metal oxide, such as compaction by suction withdrawal of the air or gas present, by means of suitable vacuum methods, or press rollers, or a combination of both methods.

Additionally it is possible in one particularly preferred procedure, following purification, to employ methods and devices for deagglomerating the metal oxides, such as pinned-disk mills, hammer mills, opposed-jet mills, impact mills or milling/classifying devices.

The compound of the general formula III is used preferably in an amount greater than 0.5% by weight (based on the metal oxide), more preferably greater than 3% by weight (based on the metal oxide), and with particular preference greater than 5% by weight (based on the metal oxide).

In one preferred embodiment of the invention the surface-modified metal oxide is further characterized in that in polar systems, such as solvent-free polymers and resins, or solutions, suspensions, emulsions, and dispersions of organic resins, in aqueous systems or in organic solvents (for example: polyesters, vinyl esters, epoxides, polyurethanes, alkyd resins, etc.) it exhibits a high thickening action. It is therefore suitable as a rheological additive in the stated systems.

In one preferred embodiment of the invention the surface-modified metal oxide is further characterized in that in nonpolar systems, such as noncrosslinked silicone rubber, it exhibits a low thickening action, but at the same time displays a high reinforcing action in the crosslinked silicone rubbers and hence is outstandingly suitable as a reinforcing filler for silicone rubbers.

The invention accordingly further provides a reinforcing filler or rheological additive characterized in that it comprises particles P1 of the invention, preferably a metal oxide of the invention, more preferably a silica of the invention.

In one preferred embodiment of the invention the surface-modified particles P1 are characterized in that in pulverulent systems they prevent instances of caking or agglomeration, under the influence of moisture, for example, but also do not tend toward reagglomeration, and hence toward unwanted separation, but instead keep powders flowable and therefore permit mixtures which are stable under load and stable on storage.

Generally speaking, particle quantities of 0.1%-3% by weight are used here, based on the pulverulent system.

This applies particularly to use in nonmagnetic and magnetic toners and developers and charge control agents, as for example in contactless or electrophotographic printing/reproduction processes, which may be 1-component and 2-component systems. This also applies in pulverulent resins which are used as coating systems.

The invention further provides for the use of the particles P1 of the invention in systems of low to high polarity, as a viscosity-imparting component. This relates to all solvent-free, solvent-containing, water-dilutable, film-forming coating materials, adhesives, sealing compounds, and casting compounds, and also to other, comparable systems.

The particle can be employed in systems such as:
epoxy systems,
polyurethane systems (PUR),
vinyl ester resins,
unsaturated polyester resins,
water-soluble and water-dispersible resin systems, low-solvent resin systems, referred to as high solids systems, and also solvent-free resins which are applied in powder form.

As a rheological additive to these systems, the particles P1 provide the requisite viscosity, pseudoplasticity, and thixotropy and a yield stress which is sufficient for the composition to be able to stand on vertical surfaces.

The particles P1 can be used especially as a rheological additive and reinforcing filler in noncrosslinked and crosslinked silicone systems, such as silicone elastomers which are composed of silicone polymers, such as polydimethylsiloxanes, fillers, and further additives. These systems can be crosslinked, for example, using peroxides or by way of addition reactions, the so-called hydrosilylation reaction, between olefinic groups and Si—H groups, or else via condensation reactions between silanol groups, examples being those which come about on exposure to water.

The particles P1 may further be used as a reinforcing filler, a rheological additive, and, additionally, as a crosslinking component in elastomers, resins, including reactive resins, and polymers.

The particles P1 may be employed, furthermore, as a rheological additive and reinforcing filler and as an additional crosslinking component for the purpose of improving the mechanical properties, such as impact strength or scratch resistance, of reactive-resin systems, such as epoxy resins, polyurethane resins, vinyl ester resins, unsaturated polyester resins or methacrylate resins, for example. This relates to all solvent-free, solvent-containing, water-dilutable, film-forming coating materials, adhesives, sealing compounds, and casting compounds, and also other, comparable systems. Typical amounts for use of the modified particle are in the range of 3%-50%, based on the resin system.

The invention further provides toners, developers, and charge control agents which comprise a surface-modified metal oxide of the invention. Examples of such developers and toners are magnetic 1-component and 2-component toners, and also nonmagnetic toners. These toners may be composed of resins, such as styrene resins and acrylic resins, and may be ground preferably to particle distributions of 1-100 μm, or may be resins which have been prepared in polymerization processes in dispersion or emulsion or solution or in bulk at particle distributions of preferably 1-100 μm. The metal oxide is used preferably to improve and control the powder flow behavior and/or to regulate and control the triboelectric charge properties of the toner or developer. Toners and developers of this kind can be used in electrophotographic printing and press processes, and can also be employed in direct image transfer processes.

The composition of a toner is typically as follows:

Solid resin binder which is sufficiently hard for a powder to be produced from it, preferably having a molecular weight of more than 10,000, preferably with a fraction of polymer with a molecular weight below 10,000, of less than 10% by weight, e.g., a polyester resin which may be a cocondensate of diol and carboxylic acid, carboxylic ester or carboxylic anhydride, having an acid number, for example, of 1-1000, preferably 5-200, or may be a polyacrylate or a polystyrene, or mixtures or copolymers thereof, and having an average particle diameter of less than 20 μm, preferably less than 15 μm, more preferably less than 10 μm.

The toner resin may comprise alcohols, carboxylic acids, and polycarboxylic acid.

Colorants typical in the art, such as black carbon black, pigmentary carbon black, cyano dyes, magenta dyes, and yellow dyes.

Typically positive charge control agents: charge-controlling additives, of the nigrosine dye type, for example, or triphenylmethane dyes substituted by tertiary amines, or quaternary ammonium salts such as CTAB (cetyltrimethylammonium bromide=hexadecyl trimethylammonium bromide), or polyamines, typically less than 5% by weight.

Optionally, negative charge control agents: charge-controlling additives such as metallic azo dyes, or copper phthalocyanine dyes, or metal complexes, for example, of alkylated salicylic acid derivatives or benzoic acid, particularly with boron or aluminum, in the required amounts, typically less than 5% by weight.

If desired it is possible, in order to prepare magnetic toners, to add magnetic powders, such as, for example, powders which can be magnetized in a magnetic field, such as ferromagnetic substances, such as iron, cobalt, nickel, alloys, or compounds such as magnetite, hematite or ferrite.

Optionally it is also possible to add developers, such as iron powder, glass powder, nickel powder, ferrite powder.

Metal oxide is used in amounts, based on a solid resin binder with an average particle diameter of 20 μm, of greater than 0.01% by weight, preferably greater than 0.1% by weight. As the average particle diameter of the binder goes down, the amounts of metal oxide required become, in general, greater, with the amount of metal oxide required increasing in inverse proportion to the particle diameter of the binder. In any case, however, the amount of metal oxide is preferably less than 5% by weight based on binder resin.

Further inorganic additions, such as fine and coarse silicon dioxides, including those with an average diameter of 100 to 1000 nm; aluminum oxides such as pyrogenic aluminum oxides; pyrogenic titanium dioxides, pyrogenic silica or anatase or rutile, and zirconium oxides, are possible.

Waxes, such as paraffinic waxes having 10-500 C atoms, silicone waxes, olefinic waxes, waxes having an iodine number of less than 50, preferably less than 25, and a hydrolysis number of 10-1000, preferably 25-300, can be employed.

The toner can be used in various development processes, such as for electrophotographic image production and reproduction, such as magnetic brush processes, cascade processes, use of conductive and nonconductive magnetic systems, powder cloud processes, development in impression, and others.

In the examples below, unless indicated otherwise in each case, all amounts and percentages are based on weight and all pressures are 0.10 MPa (abs.).

EXAMPLE 1

Preparation of
2,2-dimethyl-[1,4]dioxa-2-silacyclohexane

A mixture of 103.9 g (0.75 mol) of chloromethyl-dimethylmethoxysilane, 46.6 g (0.75 mol) of ethylene glycol and 200 ml of 1,4-diisopropylbenzene was heated to 150° C. and stirred for 3 hours. In the course of this time 24 g (0.75 mol) of methanol were removed by distillation. Thereafter, at 150° C., slowly, 138.8 g (0.75 mol) of tributylamine were added dropwise. The dropwise addition was followed by stirring at 150° C. for a further 3 hours. The resulting tributylammonium chloride salt was removed by filtration. The filtrate was subjected to fractional distillation twice under normal pressure, the fraction going over at 132° C. giving 26 g of pure 2,2-dimethyl-(1,4)-dioxa-2-silacyclohexane (132.23 g/mol, 20 mmol) with a yield of 27%.

EXAMPLE 2

At a temperature of 25° C. under $N_2$ inert gas 100 g of fumed hydrophilic silica, having a moisture content of less than 1%, an HCl content of less than 100 ppm, and a specific surface area of 200 m²/g (measured by the BET method in accordance with DIN 66131 and 66132) (available under the name WACKER HDK S13 from Wacker Chemie AG, Munich, D) are admixed with a solution of 8.5 g of 2,2-dimethyl-(1,4)-dioxa-2-silacyclohexane and 0.25 g of triethylamine in 10 ml of MeOH, in ultrafinely divided form, via a single-fluid nozzle (pressure: 5 bar). The silica thus loaded is then fluidized under $N_2$ for 0.5 h at a temperature of 25° C. and then reacted under $N_2$ for 4 h at 140° C. in a 100 l drying cabinet. This gives a white silica powder with a homogeneous layer of silylating agent.

The analytical data are set out in table 1.

TABLE 1

Analytical data of the silica from Example 2

| Example | % C | BET [m²/g] | pH |
|---------|-----|------------|-----|
| 2 | 2.8 | 119 | 6.0 |

The analysis took place by means of the following methods:

Carbon Content (% C)

Elemental analysis for carbon; combustion of the sample at >1000° C. in an $O_2$ stream, detection and quantification of the resulting $CO_2$ by IR; instrument: LECO 244

BET

Measured by the BET method in accordance with DIN 66131 and 66132 pH

4% (by weight) suspension of the silica in saturated aqueous sodium chloride solution:methanol=50:50

EXAMPLE 3

At a temperature of 30° C. in a 1 l 3-neck flask under $N_2$ inert gas 10 g of hydrophilic silica, having a moisture content <1% and an HCl content <100 ppm and a specific surface area of 130 m²/g (measured by the BET method in accordance with DIN 66131 and 66132) (available under the name WACKER HDK S13 from Wacker Chemie AG, Munich, D) are admixed with 6.5 g of 2,2-dimethyl-[1,4]dioxa-2-silacyclohexane and 60 mg of lithium methanolate solution (10% strength in methanol) (300 ppm). The mixture was homogenized by stirring and then heated at 60° C. for 3 h. Following neutralization of the catalyst with phosphoric acid, the toluene and excess silane were removed. The silica loaded in this way no longer showed any free Si—OH groups in the 29 Si NMR.

EXAMPLE 4

At a temperature of 25° C. in a 100 ml 3-neck flask 50.0 g of an $SiO_2$ organosol (IPA-ST® from Nissan Chemicals, 30% by weight $SiO_2$, average particle size 12 nm) are admixed with 1.98 g (14.9 mmol) of 2,2-dimethyl-[1,4]dioxa-2-silacyclohexane. The mixture is stirred at 50° C. for 6 h and at room temperature for a further 24 h, giving a clear suspension which exhibits a weak Tyndall effect. $^1$H NMR and $^{29}$Si NMR show that about 80% of the cyclic silane has reacted with the particle. This conversion cannot be increased further even by means of longer reaction times.

EXAMPLE 5

At a temperature of 25° C. in a 100 ml 3-neck flask 50.0 g of an $SiO_2$ organosol (IPA-ST® from Nissan Chemicals, 30% by weight $SiO_2$, average particle size 12 nm) are admixed with 1.98 g (14.9 mmol) of 2,2-dimethyl-[1,4]dioxa-2-silacyclohexane. The mixture is stirred at 20° C. for 48 h, giving a clear suspension which exhibits a weak Tyndall effect. $^1$H NMR and $^{29}$Si NMR show that about 80% of the cyclic silane has reacted with the particle.

The invention claimed is:

1. Surface-modified particles comprising particles having a surface, and having radicals of the formula (II)

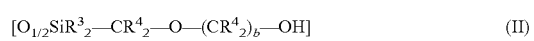

bonded to the surface, where

R³ and R⁴ are identical or different and are a hydrogen radical or a monovalent $C_{1-20}$ hydrocarbon radical or $C_{1-15}$ hydrocarbonoxy radical which is unsubstituted, or is substituted by —CN, —NCO, —NR$^x_2$, —COOH, —COOR$^x$, —PO(OR$^x$)$_2$, -halogen, -acryloyl, -epoxy, —SH, —OH or CONR$^x_2$ groups, wherein in the $C_{1-20}$ hydrocarbon radical and $C_{1-15}$ hydrocarbonoxy radical, one or more nonadjacent methylene units are optionally replaced by one or more groups —O—, —CO—, —COO—, —OCO—, —OCOO—, —S—, or —NR$^x$—, and in which one or more nonadjacent methine units are optionally replaced by groups —N═, —N═, or —P═, R$^x$ is a hydrogen radical or an unsubstituted or —CN— or halogen-substituted $C_1$-$C_{10}$ hydrocarbon radical, and wherein b is an integral value of at least 1.

2. The surface-modified particles of claim 1, wherein the particles having a surface comprise metal oxide particles.

3. The surface-modified particles of claim 1, wherein the particles having a surface comprise silica particles.

4. The surface-modified particles of claim 1, wherein the particles having a surface have an average primary-particle size of less than 100 nm.

5. The surface modified particles of claim 1, wherein the particles having a surface have a specific surface area of 10 to 400 m²/g.

6. The surface-modified particles of claim 1, wherein the particles having a surface are silica particles having a fractal mass dimension $D_m$ of less than or equal to 2.8 and a surface silanol group SiOH density of less than 1.5 SiOH/nm².

7. A process for preparing surface-modified particles of claim 1, comprising reacting (a) particles of a material which possess a surface having a radical selected from the group consisting of M-OH, Si—OH, M-O-M, M-O—Si, Si—O—Si, M-OR¹, and Si—OR¹

(b) with compounds of the formula III

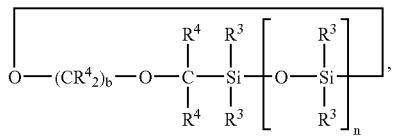

(III)

and/or their hydrolysis, alcoholysis or polymerization products, where $R^3$, $R^4$ are a hydrogen atom or monovalent, unsubstituted or —CN—, —NCO—, —NR$^x$$_2$—, —COOH—, COOR$^x$—, —PO(OR$^x$)$_2$—, -halogen-, -acryloyl-, -epoxy, —SH—, —OH— or CONR$^x$$_2$-substituted $C_1$-$C_{20}$ hydrocarbon or $C_1$-$C_{15}$ hydrocarbonoxy radical in each of which one or more nonadjacent methylene units are optionally replaced by one or more groups —O—, —CO—, —COO—, —OCO—, or —OCOO—, —S—, or —NR$^x$—, and in which one or more nonadjacent methine units are optionally replaced by groups —N=, —N=, or —P=, $R^x$ is hydrogen or an unsubstituted or —CN— or halogen-substituted $C_1$-$C_{10}$ hydrocarbon radical, b is an integer of at least 1, and n is 0 or a positive integer.

8. The process of claim 7, wherein compounds of the formula III comprise compounds of the formula IV

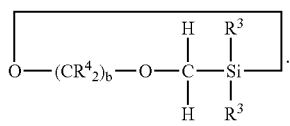

(IV)

9. The process of claim 7, wherein the particles of step (a) comprise fumed silica having a fractal surface dimension of less than or equal to 2.3.

10. The process of claim 7, comprising the following steps:
(A) supplying a particle having a surface, and,
(B) silylating the particle, comprising the steps of
(1) loading the particle with a compound of the formula III,
(2) reacting the particle with the compound of the formula III, and
(3) purifying the particle to remove excess compound of the formula III, to form a silylated particle.

11. The process of claim 7, wherein the compounds of the formula III are used in a mixture with organosiloxanes composed of units of the formulae ($R^5$$_3$SiO$_{1/2}$), and/or ($R^5$$_2$SiO$_{2/2}$), and/or ($R^5$SiO$_{3/2}$), the number of these units in the organosiloxane being at least 2, wherein each $R^5$ is identical or different and is a monovalent, saturated or unsaturated, optionally halogenated hydrocarbon radical having 1 to 18 C atoms, or is a halogen radical, nitrogen radical, OR$^6$, OCOR$^6$ or O(CH$_2$)$_x$OR$^6$, R$^6$ being hydrogen or a monovalent hydrocarbon radical having 1 to 18 C atoms.

12. The process of claim 10, wherein the compounds of the formula III are used in a mixture with organosiloxanes composed of units of the formulae ($R^5$$_3$SiO$_{1/2}$), and/or ($R^5$$_2$SiO$_{2/2}$), and/or ($R^5$SiO$_{3/2}$), the number of these units in the organosiloxane being at least 2, wherein each $R^5$ is identical or different and is a monovalent, saturated or unsaturated, optionally halogenated hydrocarbon radical having 1 to 18 C atoms, or is a halogen radical, nitrogen radical, OR$^6$, OCOR$^6$ or O(CH$_2$)$_x$OR$^6$, R$^6$ being hydrogen or a monovalent hydrocarbon radical having 1 to 18 C atoms.

13. The process of claim 10, wherein the process is carried out in an atmosphere which does not lead to oxidation of the silylated particle.

14. A reinforcing filler or rheological additive comprising particles of claim 1.

15. A toner, developer or charge control agent comprising particles of claim 1.

16. The surface modified particles of claim 1, where b is 2.

17. The process of claim 7, wherein b is 2.

18. The process of claim 7, wherein n is 0.

19. The process of claim 7, wherein b is 2 and n is 0.

* * * * *